UNITED STATES PATENT OFFICE.

AUGUSTINE LORENZ, OF NEW YORK, N. Y.

TONIC.

SPECIFICATION forming part of Letters Patent No. 416,473, dated December 3, 1889.

Application filed August 28, 1889. Serial No. 322,245. (No specimens.)

*To all whom it may concern:*

Be it known that I, AUGUSTINE LORENZ, of the city, county, and State of New York, have invented a new and useful Medical Compound or Invigorating-Bitters; and I do hereby declare that the following is a full and exact description thereof.

This invention relates to a vegetable compound for use as a medicine for the invigoration of the system in case of lassitude, debility, and the consequences of overexertion and fatigue, either mentally or physically.

It consists of an infusion of equal parts of horse-radish root and the root of European lovage, to which sufficient alcohol is added to prevent fermentation or decomposition, and which is sweetened and flavored to render it more palatable, all substantially as hereinafter described and claimed.

In manufacturing my invigorating-bitters I take about five ounces of horse-radish root, previously dried and cut up into small pieces, and about five ounces of European lovage-root, likewise dried and comminuted, and steep the same for about nine or ten days in one quart of water to which has been added one quart of alcohol. The liquid is then drained off and sweetened by the addition thereto of about five ounces of rock-candy.

For the purpose of flavoring the compound I sometimes add to the horse-radish and lovage in the alcohol and water, taken in the proportions above named, about one ounce of dried and comminuted calamus-root, so that its properties and virtues may be included in the infusion. I also contemplate substituting sherry or other wine for the pure alcohol in the compound.

In the use of these bitters for a debilitated condition of the system in adults a small wine-glassful is to be taken three times a day, preferably at meal times, until the normal strength is regained, when the dose should be diminished gradually. For children about twenty drops may be given once or twice a day, unless in cases of extreme lassitude, when it may be given three times a day.

I claim as my invention—

The within-described medical compound, consisting of an infusion of horse-radish and lovage roots in alcohol and water, substantially in the proportions set forth.

In testimony whereof I have signed my name to this specification in the presence of two subscribing witnesses.

AUGUSTINE LORENZ.

Witnesses:
R. A. G. LORENZ,
A. N. JESBERA.